United States Patent
Heins et al.

(10) Patent No.: US 10,050,570 B2
(45) Date of Patent: Aug. 14, 2018

(54) MOTOR CONTROL CIRCUIT AND METHOD OF USE

(71) Applicants: Regal Beloit America, Inc., Beloit, WI (US); Regal Beloit Australia Pty Ltd, Rowville, Victoria (AU); Changzhou Regal-Beloit Sinya Motor Co., LTD, Changzhou, Jiangsu (CN)

(72) Inventors: Greg Heins, Rowville (AU); Lyell Douglas Embery, Rowville (AU); Hani Chahine, Rowville (AU); Bin Chen, Jiangsu (CN); Dingcheng Wang, Jiangsu (CN)

(73) Assignees: Regal Beloit America, Inc., Beloit, WI (US); Regal Beloit Australia Pty Ltd, Rowville, Victoria (AU); Changzhou Regal-Beloit Sinya Motor Co., Ltd., Changzhou, Jiangsu (CN)

( * ) Notice: Subject to any disclaimer, the term of this patent is extended or adjusted under 35 U.S.C. 154(b) by 0 days.

(21) Appl. No.: 15/266,697

(22) Filed: Sep. 15, 2016

(65) Prior Publication Data
US 2017/0077849 A1  Mar. 16, 2017

(30) Foreign Application Priority Data
Sep. 15, 2015 (CN) .......................... 2015 1 0587676

(51) Int. Cl.
*H02P 6/17* (2016.01)
*H02P 23/16* (2016.01)

(52) U.S. Cl.
CPC ................ *H02P 6/17* (2016.02); *H02P 23/16* (2016.02)

(58) Field of Classification Search
USPC .................................................. 318/463, 464
See application file for complete search history.

(56) References Cited

U.S. PATENT DOCUMENTS

| | | | | |
|---|---|---|---|---|
| 3,586,949 A * | 6/1971 | Spear | ...................... | H02P 7/293 318/257 |
| 4,227,137 A * | 10/1980 | Hartman | .................. | H02P 23/22 318/801 |
| 4,228,396 A * | 10/1980 | Palombo | .................. | G01P 3/486 318/272 |
| 4,284,942 A * | 8/1981 | Bigley | ..................... | H02P 23/16 318/615 |
| 4,295,081 A * | 10/1981 | Bigley, Jr. | ................. | G05B 5/01 388/820 |
| 4,341,986 A * | 7/1982 | Browder | .............. | G05B 19/353 318/561 |

(Continued)

FOREIGN PATENT DOCUMENTS

CN  204063313 U  12/2014
WO  1995008745 A1  3/1995

*Primary Examiner* — Bentsu Ro
(74) *Attorney, Agent, or Firm* — Armstrong Teasdale LLP

(57) ABSTRACT

A motor control circuit is provided, including a first circuit, a second circuit, and a microcontroller. The first circuit is configured to conduct an analog tachometer output signal. The second circuit is configured to conduct an analog control input signal. The microcontroller is coupled to the first circuit and the second circuit, and is configured to transmit and receive serial data over a serial channel including the first circuit and the second circuit.

20 Claims, 3 Drawing Sheets

(56) References Cited

U.S. PATENT DOCUMENTS

| | | | |
|---|---|---|---|
| 4,746,846 A * | 5/1988 | Champavier | ......... H02P 7/2855 |
| | | | 318/271 |
| 4,751,501 A | 6/1988 | Gut | |
| 4,978,896 A | 12/1990 | Shah | |
| 7,941,294 B2 | 5/2011 | Shahi et al. | |

* cited by examiner

MOTOR CONTROL CIRCUIT AND METHOD OF USE

PRIORITY

This application claims the benefit of priority of Chinese Patent Application No. 201510587676.X titled "Motor Control Circuit and Method of Use," filed on Sep. 15, 2015, which is hereby incorporated herein in its entirety.

BACKGROUND OF THE DISCLOSURE

The field of the invention relates generally to electric motors, and more specifically, to a motor control circuit that facilitates serial communication.

Electric motors are used in a variety of systems operating in a variety of industries. For example, electric motors are used to power products such as fans used in heating, ventilation and air conditioning systems (HVAC). Many direct current (DC) motors in HVAC applications typically utilize a 5-wire interface for power, control, and motor feedback.

In at least some known systems, additional data is transmitted to and from a motor over additional channels. This additional data includes, for example, motor current, motor voltage, fault conditions, estimated flow, estimated pressure, and estimated filter blockage. Additional channels are added to the interface by adding appropriate wires for analog or digital circuits.

BRIEF DESCRIPTION

In one aspect, a motor control circuit is provided. The motor control circuit includes a first circuit, a second circuit, and a microcontroller. The first circuit is configured to conduct an analog tachometer output signal. The second circuit is configured to conduct an analog control input signal. The microcontroller is coupled to the first circuit and the second circuit, and is configured to transmit and receive serial data over a serial channel including the first circuit and the second circuit.

In another aspect, a method of operating a motor is provided. The method includes receiving an analog control input signal from an analog input circuit. The method further includes operating the motor according to the control input signal. The method further includes transmitting an analog tachometer output signal to an analog output circuit, the analog tachometer output signal indicative of an operating speed for the motor. The method further includes receiving serial data on a serial channel including the analog input circuit and the analog output circuit. The method further includes transmitting serial data on the serial channel.

In yet another aspect, a motor is provided. The motor includes a stator, a rotor, a wiring interface, and a motor controller. The rotor is configured to turn within the stator. The wiring interface includes an analog input circuit and an analog output circuit. The motor controller is coupled to the wiring interface and is configured to cause the rotor to turn according to an analog control input signal received over the analog input circuit. The motor controller is further configured to transmit an analog tachometer output signal over the analog output circuit, the analog tachometer output signal indicative of an operating speed for the motor. The motor controller is further configured to transmit and receive serial data over a serial channel including the analog input circuit and the analog output circuit.

DETAILED DESCRIPTION

The methods and systems described herein facilitate smart-motor technology. As described herein, the motor control circuit facilitates transmission and reception of serial data at a motor without adding conductors to the motor control interface. Analog input and output channels, typically used for motor control input and tachometer output, are further utilized to establish a serial channel between a motor controller and a remote controller. Serial data is transmitted over the analog channels such that the motor control circuit can operate the motor in an analog mode using the analog motor control input and the analog tachometer output, or in a serial mode using the serial data.

Technical effects of the methods and systems described herein include at least one of: (a) optionally operating a motor in an analog mode or a serial mode; (b) operating a motor in a serial mode utilizing a common wiring interface with the analog mode; (c) utilizing serial data without additional conductors in the wiring interface; (d) simplifying field installation and maintenance by including a motor operable in both an analog mode and a serial mode in a single motor control package; and (e) facilitating automatic selection of an analog mode or serial mode of motor operation.

Figure 1:
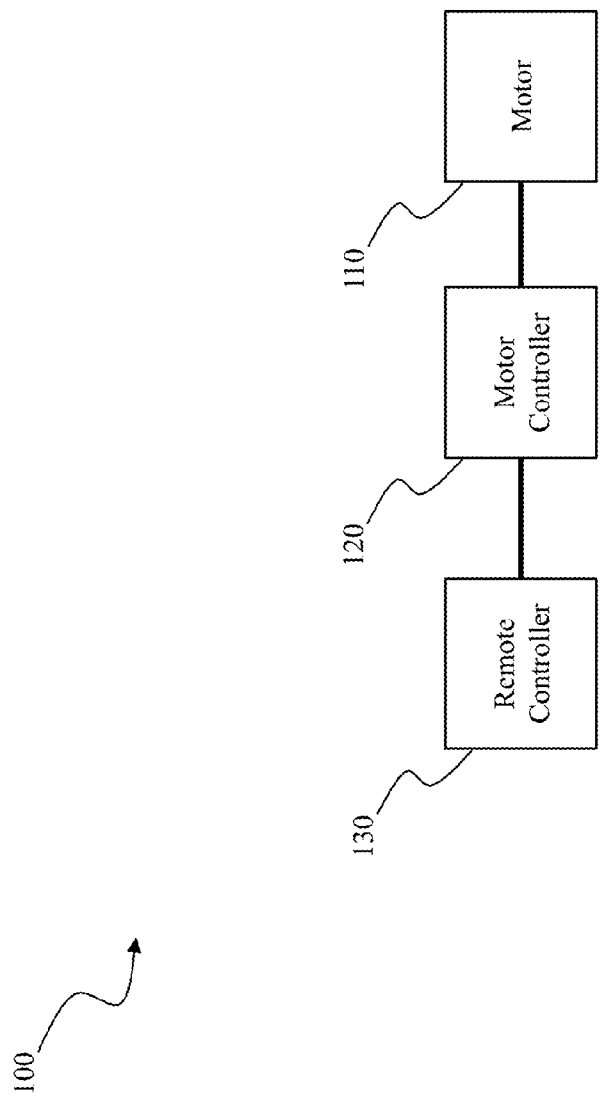
FIG. 1 is a block diagram of an exemplary electrical system.

FIG. 1 is a block diagram of an exemplary electrical system 100. Electrical system 100 includes a motor 110 and a motor controller 120. Motor 110 is controllable by motor controller 120, which is typically located on or near motor 110. Motor 110 is an electric motor and may run on AC or DC power. In certain embodiments, motor 110 is a DC motor in an HVAC system and turns a fan or blower that moves air through a filter and ducts.

Motor controller 120 includes a microcontroller or other suitable processor that executes a program for controlling motor 110. Motor controller 120 regulates power provided to motor 110, and further controls motor speed. Motor controller 120 also collects and disseminates smart-motor data, including, for example, motor speed, motor torque, voltage, and current. In certain embodiments, where motor 110 turns a fan or blower that moves air through a filter, motor controller 120 collects and disseminates filter blockage data.

Electrical system 100 also includes a remote controller 130 that communicably couples with motor controller 120. While motor controller 120 is located on or near motor 110, remote controller 130 is displaced from motor 110 and communicates with motor 110 through motor controller 120. Remote controller 130 communicates with motor controller 120 through a wiring interface to a motor control circuit. The wiring interface to the motor control circuit includes an analog input circuit and an analog output circuit. Remote controller 130 transmits and receives smart-motor data, as well as control and output data from motor 110 through the wiring interface.

The motor control circuit, in certain embodiments, may include power electronics and input/output circuits. The analog input circuit facilitates transmission of an analog control input signal from the remote controller 130 to motor controller 120. The analog output circuit facilitates transmission of an analog output signal from motor 110 and motor controller 120 to remote controller 130.

In certain embodiments, the wiring interface to the motor control circuit includes a ground conductor, a motor power voltage input conductor, and a control power voltage input conductor. These additional conductors are utilized for providing power to motor 110.

Figure 2:
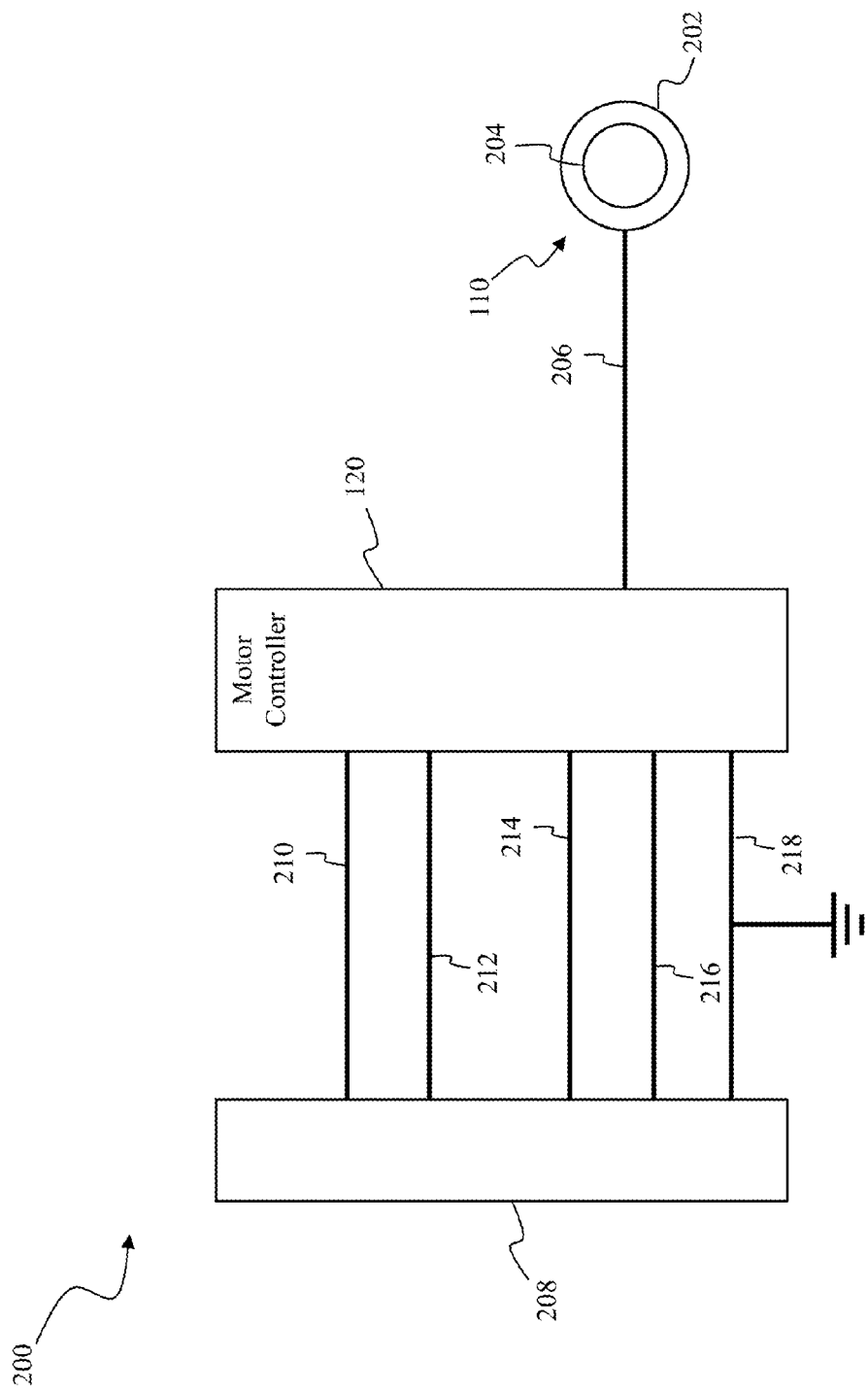
FIG. 2 is a block diagram of an exemplary motor control circuit for the electrical system shown in FIG. 1.

FIG. 2 is a block diagram of an exemplary motor control circuit 200 for electrical system 100 (shown in FIG. 1). Motor control circuit 200 includes motor 110 and motor controller 120 (shown in FIG. 1). Motor 110 includes a stator 202 within which a rotor 204 turns. Motor controller 120 is electrically coupled to motor 110 through a motor interface 206 that conducts power and data. Motor control circuit 200 communicably couples to a wiring interface 208 for remote controller 130 (shown in FIG. 1).

Motor control circuit 200 includes an analog input circuit 210 and an analog output circuit 212, each coupled between motor controller 120 and wiring interface 208. Analog input circuit 210 conducts an analog control input signal transmitted by remote controller 130, over wiring interface 208, to motor controller 120. The analog control input signal, in certain embodiments, is a speed control signal, such as, for example, a 0-6 volt DC signal indicating a speed set-point for motor 110.

Analog output circuit 212 conducts an analog output signal transmitted from motor controller to remote controller 130. The analog output signal, in certain embodiments, is a tachometer output signal indicating a measured speed of motor 110, such as, for example, a variable-frequency pulse signal.

Motor controller 120 is configured to utilize analog input circuit 210 and analog output circuit 212 together as a serial channel for transmitting and receiving smart-motor data as serial data between motor controller 120 and remote controller 130 through wiring interface 208. Motor controller 120, in certain embodiments, includes a microcontroller and non-transitory memory on which executable instructions are stored. The executable instructions, when executed, cause the microcontroller to determine whether to operate in an analog mode or a serial mode, and further facilitate the microcontroller to operate motor 110 accordingly.

In the analog mode, motor controller 120 utilizes analog input circuit 210 and analog output circuit 212 to operate motor 110 according to an analog control input signal, and to report back an analog output signal, such as an analog tachometer signal.

In the serial mode, motor controller 120 utilizes a serial channel formed by analog input circuit 210 and analog output circuit 212 to transmit and receive serial data. The serial data, in certain embodiments, includes a speed control input and a tachometer output. The serial data, in certain embodiments, includes motor voltage, current, and torque. The serial channel, in one embodiment, includes analog input circuit 210 as a receive (RX) line, and analog output circuit 212 as a transmit (TX) line.

Motor controller 120, in certain embodiments, operates in the analog mode until a valid serial message is received through wiring interface and the serial channel formed by analog input circuit 210 and analog output circuit 212. Once a valid serial message is received, motor controller 120 switches to the serial mode. In certain embodiments, motor controller 120 stays in the serial mode until manually switched back to analog mode, or until power is cycled.

Motor control circuit 200 includes a motor power voltage input circuit 214, a control power voltage input circuit 216, and a ground 218 for providing power to motor 110.

Figure 3:
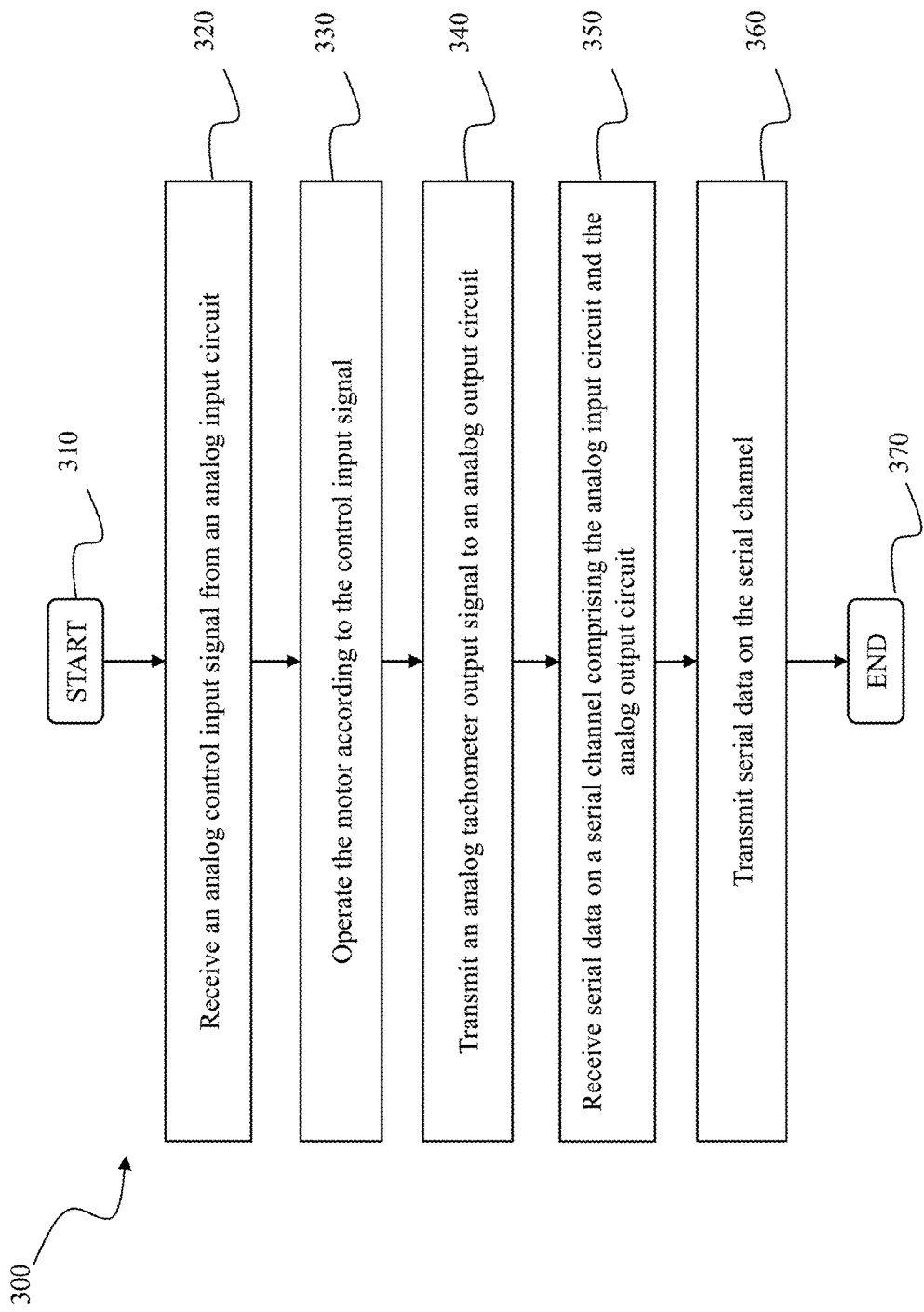
FIG. 3 is a flow chart of an exemplary method of operating the motor shown in FIG. 2.

FIG. 3 is a flow chart of an exemplary method 300 of operating motor 110 and motor control circuit 200 (shown in FIG. 2). Method 300 begins at a start step 310. At a control input step 320, an analog control input signal is received at motor controller 120 over analog input circuit 210. Motor 110 is operated at operation step 330 according to the received analog control input signal. At a tachometer output step 340, an analog tachometer output signal indicating the speed at which motor 110 is turning is transmitted from motor controller 120 over analog output circuit 212.

At serial receive step 350, serial data is received over the serial channel formed by analog input control circuit 210 and analog output circuit 212. The serial data received may include, for example, a speed set-point.

At a serial transmit step 360, serial data is transmitted over the serial channel. The serial data transmitted may include, for example, motor speed, motor torque, voltage, and current. In certain embodiments, the serial data transmitted includes filter blockage information. Method 300 ends at an end step 370.

The systems and methods described herein facilitate utilizing serial data in a motor control circuit. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and systems described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A motor control circuit, comprising:
a first circuit configured to conduct an analog tachometer output signal;
a second circuit configured to conduct an analog control input signal; and
a microcontroller coupled to said first circuit and said second circuit, said microcontroller configured to transmit and receive serial data other than the analog tachometer output signal and the analog control input signal over a serial channel comprising said first circuit and said second circuit.

2. The motor control circuit of claim 1 further comprising a power circuit comprising a ground conductor, a motor power voltage input conductor, and a control power voltage input conductor.

3. The motor control circuit of claim 1, wherein the serial data comprises motor speed and motor torque.

4. The motor control circuit of claim 1, wherein said analog control input signal represents a speed control voltage input.

5. The motor control circuit of claim 1, wherein said microcontroller is further configured to receive the serial data on said second circuit.

6. The motor control circuit of claim 1, wherein said microcontroller is further configured to transmit the serial data on said first circuit.

7. The motor control circuit of claim 1, wherein said microcontroller is further configured to switch from an analog mode to a serial mode when a valid serial command is received over said serial channel.

8. A method of operating a motor, said method comprising:
receiving an analog control input signal from an analog input circuit;
operating the motor according to the control input signal;
transmitting an analog tachometer output signal to an analog output circuit, the analog tachometer output signal indicative of an operating speed for the motor;
receiving serial data other than the analog control input signal on a serial channel comprising the analog input circuit and the analog output circuit; and
transmitting serial data other than the analog tachometer output signal on the serial channel.

9. The method of claim 8 further comprising providing power to the motor using a ground conductor, a motor power voltage input conductor, and a control power voltage input conductor.

10. The method of claim 8 further comprising determining to operate in one of an analog mode using the analog control input signal and the analog tachometer output signal, and a serial mode using the serial channel.

11. The method of claim 10, wherein determining to operate in one of the analog mode and the serial mode comprises:
detecting a valid serial command using the analog input circuit as a serial receive line; and
switching from the analog mode to the serial mode.

12. The method of claim 8, wherein transmitting serial data on the serial channel comprises:
generating serial data including motor speed; and
transmitting the serial data using the analog output circuit as a serial transmit line.

13. The method of claim 8, wherein transmitting serial data on the serial channel comprises:
generating serial data including motor torque; and
transmitting the serial data using the analog output circuit as a serial transmit line.

14. The method of claim 8 further comprising:
executing a motor control program on a microcontroller coupled to the serial channel; and
operating the motor according to received serial data and the motor control program.

15. A motor comprising:
a stator;
a rotor configured to turn within said stator;
a wiring interface comprising:
an analog input circuit; and
an analog output circuit;
a motor controller coupled to said wiring interface and configured to:
cause said rotor to turn according to an analog control input signal received over said analog input circuit;
transmit an analog tachometer output signal over said analog output circuit, the analog tachometer output signal indicative of an operating speed for the motor; and
transmit and receive serial data over a serial channel comprising said analog input circuit and said analog output circuit.

16. The motor of claim 15, wherein said wiring interface consists of five wires, said five wires including:
said analog input circuit;
said analog output circuit;
a ground conductor;
a motor power voltage input conductor; and
a control power voltage input conductor.

17. The motor of claim 15, wherein said motor controller comprises a microcontroller.

18. The motor of claim 15, wherein said motor controller is further configured to receive serial data including a serial speed control input.

19. The motor of claim 15, wherein said motor controller is further configured to transmit serial data including a serial tachometer output.

20. The motor of claim 15, wherein said motor controller is further configured to switch from an analog mode using the analog control input signal and the analog tachometer output signal, to a serial mode using said serial channel upon receiving a valid serial command over said serial channel.

* * * * *